United States Patent
Peled et al.

(10) Patent No.: US 7,181,625 B2
(45) Date of Patent: Feb. 20, 2007

(54) SECURE DISTRIBUTION OF DIGITAL CONTENT

(75) Inventors: Ariel Peled, Even-Yehuda (IL); Oren Tirosh, Hod-Hasharon (IL); Assaf Litai, Kfar-Sava (IL); Arik Baratz, Hadera (IL); Lidror Troyansky, Ramat-Gan (IL)

(73) Assignee: Vidius Inc., Beverly Hills, CA (US)

( * ) Notice: Subject to any disclaimer, the term of this patent is extended or adjusted under 35 U.S.C. 154(b) by 1162 days.

(21) Appl. No.: 09/761,149

(22) Filed: Jan. 17, 2001

(65) Prior Publication Data

US 2002/0095582 A1 Jul. 18, 2002

Related U.S. Application Data

(60) Provisional application No. 60/240,739, filed on Oct. 17, 2000.

(51) Int. Cl.
*H04L 9/10* (2006.01)
*H04L 1/00* (2006.01)
*G06K 9/00* (2006.01)

(52) U.S. Cl. .............. 713/180; 713/194; 713/181; 713/176; 382/100; 382/232

(58) Field of Classification Search ........ 713/175–205; 380/100, 200; 705/40–57
See application file for complete search history.

(56) References Cited

U.S. PATENT DOCUMENTS

| | | | |
|---|---|---|---|
| 5,502,576 A | 3/1996 | Ramsay et al. | |
| 5,745,678 A * | 4/1998 | Herzberg et al. | 713/200 |
| 5,809,139 A * | 9/1998 | Girod et al. | 380/202 |
| 5,920,861 A | 7/1999 | Hall et al. | |
| 5,943,422 A | 8/1999 | Van Wie et al. | |
| 5,946,414 A | 8/1999 | Cass et al. | |
| 5,974,548 A | 10/1999 | Adams | |
| 6,122,403 A | 9/2000 | Rhoads | |
| 6,411,725 B1 * | 6/2002 | Rhoads | 382/100 |
| 6,499,105 B1 * | 12/2002 | Yoshiura et al. | 713/176 |
| 6,513,118 B1 * | 1/2003 | Iwamura | 713/176 |
| 6,529,506 B1 * | 3/2003 | Yamamoto et al. | 370/389 |
| 6,668,246 B1 * | 12/2003 | Yeung et al. | 705/57 |
| 6,724,914 B2 * | 4/2004 | Brundage et al. | 382/100 |
| 6,801,576 B1 * | 10/2004 | Haldeman et al. | 375/240.29 |
| 7,062,069 B2 * | 6/2006 | Rhoads | 382/100 |
| 2002/0007403 A1 | 1/2002 | Echizen et al. | |
| 2002/0090110 A1 | 7/2002 | Braudaway et al. | |

FOREIGN PATENT DOCUMENTS

KR     2001-008048     2/2001

OTHER PUBLICATIONS

Gervais, DJ, "Electronic Rights Management and Digital Identifier", *J. Electronic Publishing*, www.press.umich.edu/jep/04-03/gervais.html, 20 pages, 1998.

(Continued)

*Primary Examiner*—Syed A. Zia

(57) ABSTRACT

A method for secure distribution of digital content, the method including the steps of dividing a unit of digital content into at least first and second portions, storing the first portion on a first computerized apparatus, digitally watermarking the second portion, and combining the first portion and the digitally watermarked second portion, thereby forming a watermarked version of the digital content.

10 Claims, 7 Drawing Sheets

OTHER PUBLICATIONS

Chicola et al, "Digital Right Architecture for Intellectual Property Protection", Joint paper by MIT (Ethics and Law on the Electronic Fronteir 6.805/STS085) and Harvard Law School (The Law of Cyberspace: Social Protocols) 1998101 pages.

* cited by examiner

SECURE DISTRIBUTION OF DIGITAL CONTENT

CROSS-REFERENCE TO RELATED APPLICATIONS

This application is related to and claims priority from a U.S. Provisional Patent Application No. 60/240,739, entitled "SYSTEM FOR EFFICIENT DISTRIBUTION OF INDIVIDUALLY WATERMARKED COPIES OF DIGITAL MEDIA," filed Oct. 17, 2000, to Applicant Ariel Peled, et al., incorporated herein by reference in its entirety.

FIELD OF INVENTION

The present invention relates in general to digital content distribution systems and methods and anti-piracy methods therefor.

BACKGROUND OF THE INVENTION

Systems and methods for distribution of digital content to end-users are well known. In one such system, identical copies of digital content are distributed by a content server via a computer network, such as the Internet, to one or more proxy servers. An end-user requesting digital content from the content server may then be redirected to a proxy server that is nearer to the end-user than is the content server. The proxy server then distributes the digital content to the end-user more quickly and efficiently than would the content server, as the content has less far to travel.

Methods for anti-piracy protection of digital content are also well known. In one such method, a digital watermark that is uniquely associated with a particular end-user is embedded into the digital content at the content server prior to distribution to the end-user. The network is then monitored for unauthorized redistribution of the digital content to other end-users not associated with the digital watermark.

While it would be advantageous to combine methods of efficient distribution of digital content with anti-piracy methods that employ digital watermarking, current proxy server-based distribution methods require that all copies of digital content stored on proxy servers be identical, while digital watermarking methods often require that unique variants of the original content be created. Clearly, the storage of each variant on every proxy server would be inefficient and impractical, if not impossible.

Some prior art systems attempt to solve this problem by distributing identical copies of digital content to proxy servers and end-users, and embedding the digital watermark into the digital content at the end-user's receiving apparatus. However, this approach does not provide an adequate level of security as the receiving apparatus may be tampered with and, therefore, cannot be trusted to perform the embedding of the watermark.

The following U.S. Patents are believed to be representative of the current state of the art of digital watermarking techniques: U.S. Pat. Nos. 5,809,139, 5,915,027, 5,960,081, 6,069,914, and 6,131,161.

The disclosures of all patents, patent applications, and other publications mentioned in this specification and of the patents, patent applications, and other publications cited therein are hereby incorporated by reference.

SUMMARY OF THE INVENTION

The present invention seeks to provide a novel method of secure distribution of digital content. Original content such as a video content, audio content, or other digitally-encoded content is split into at least two portions of substantially unequal size, with one or both portions preferably being crippled or disabled. Identical copies of the larger part are distributed to proxy servers using any known distribution means. The smaller part can then be uniquely watermarked and recombined with the larger part at a remote site, such as at the proxy server or at the end-user's receiving apparatus, thereby creating a usable copy of the digital content. The present invention is advantageous in that it provides for unique watermarking of digital content in conjunction with proxy-server based distribution networks optimized for storing and delivering identical copies of digital content. The system can also be used in order to elevate the general level of security in systems for distribution of digital content.

There is thus provided in accordance with a preferred embodiment of the present invention a method for secure distribution of digital content, the method including the steps of dividing a unit of digital content into at least first and second portions, storing the first portion on a first computerized apparatus, digitally watermarking the second portion, possibly storing the digitally watermarked second portion on a second computerized apparatus, and combining the first portion and the digitally watermarked second portion, thereby forming a watermarked version of the digital content.

In another aspect of the present invention the dividing step includes dividing the digital content into at least first and second portions, where each of the portions includes non-contiguous segments of the digital content.

In another aspect of the present invention the dividing step includes dividing the digital content into at least first and second portions, where the first portion is larger than the second portion.

In another aspect of the present invention the dividing step includes dividing the digital content such that a qualitative measure of either of the first and second portions is degraded relative to a corresponding qualitative measure of the digital content.

In another aspect of the present invention the dividing step includes dividing the digital content such that either of the first and second portions are individually inoperable.

In another aspect of the present invention the storing of the first portion step includes storing on a proxy server.

In another aspect of the present invention the digitally watermarking step includes uniquely watermarking the second portion.

In another aspect of the present invention the method further includes the steps of receiving a request from a requester for the digital content, and sending the watermarked version of the digital content to the requestor.

In another aspect of the present invention the combining step includes combining at either of the computerized apparatus.

In another aspect of the present invention the combining step includes sending the portions to a third computerized apparatus and combining at the third computerized apparatus.

There is also provided in accordance with a preferred embodiment of the present invention a method for secure distribution of digital content, the method including the steps of dividing a unit of digital content into at least first and second portions, where the first portion is larger than the second portion, and where the dividing step includes either of dividing the digital content such that a qualitative measure of either of the first and second portions is degraded relative to a corresponding qualitative measure of the digital content, and dividing the digital content such that either of the first and second portions are individually inoperable, storing the first portion on a first computerized apparatus, storing the second portion on a second computerized apparatus, and combining the first portion and the second portion, thereby recreating the digital content.

In another aspect of the present invention the dividing step includes dividing the digital content into at least first and second portions, where each of the portions includes non-contiguous segments of the digital content.

In another aspect of the present invention the storing of the first portion step includes storing on a proxy server.

In another aspect of the present invention the method further includes the steps of receiving a request from a requestor for the digital content, and sending the recreated digital content to the requestor.

In another aspect of the present invention the combining step includes combining at either of the computerized apparatus.

In another aspect of the present invention the combining step includes sending the portions to a third computerized apparatus and combining at the third computerized apparatus.

There is additionally provided in accordance with a preferred embodiment of the present invention a system for secure distribution of digital content, the system including means for dividing a unit of digital content into at least first and second portions, means for storing the first portion on a first computerized apparatus, means for digitally watermarking the second portion, means for storing the digitally watermarked second portion on a second computerized apparatus, and means for combining the first portion and the digitally watermarked second portion, thereby forming a watermarked version of the digital content.

In another aspect of the present invention the means for dividing is operable to divide the digital content into at least first and second portions, where each of the portions includes non-contiguous segments of the digital content.

In another aspect of the present invention the means for dividing is operable to divide the digital content into at least first and second portions, where the first portion is larger than the second portion.

In another aspect of the present invention the means for dividing is operable to divide the digital content such that a qualitative measure of either of the first and second portions is degraded relative to a corresponding qualitative measure of the digital content.

In another aspect of the present invention the means for dividing is operable to divide the digital content such that either of the first and second portions are individually inoperable.

In another aspect of the present invention the means for storing the first portion is operative to store on a proxy server.

In another aspect of the present invention the means for digitally watermarking is operative to uniquely watermark the second portion.

In another aspect of the present invention the system further includes means for receiving a request from a requestor for the digital content, and means for sending the watermarked version of the digital content to the requestor.

In another aspect of the present invention the means for combining is operative to combine at either of the computerized apparatus.

In another aspect of the present invention the means for combining is operative to send the portions to a third computerized apparatus and combine at the third computerized apparatus.

There is also provided in accordance with a preferred embodiment of the present invention a system for secure distribution of digital content, the system including means for dividing a unit of digital content into at least first and second portions, where the first portion is larger than the second portion, the means for dividing being operative to either of divide the digital content such that a qualitative measure of either of the first and second portions is degraded relative to a corresponding qualitative measure of the digital content, and divide the digital content such that either of the first and second portions are individually inoperable, means for storing the first portion on a first computerized apparatus, means for storing the second portion on a second computerized apparatus, and means for combining the first portion and the second portion, thereby recreating the digital content.

In another aspect of the present invention the means for dividing is operative to divide the digital content into at least first and second portions, where each of the portions includes non-contiguous segments of the digital content.

In another aspect of the present invention the means for storing the first portion is operative to store on a proxy server.

In another aspect of the present invention the system further includes means for receiving a request from a requestor for the digital content, and means for sending the recreated digital content to the requestor.

In another aspect of the present invention the means for combining is operative to combine at either of the computerized apparatus.

In another aspect of the present invention the means for combining is operative to send the portions to a third computerized apparatus and combine at the third computerized apparatus.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
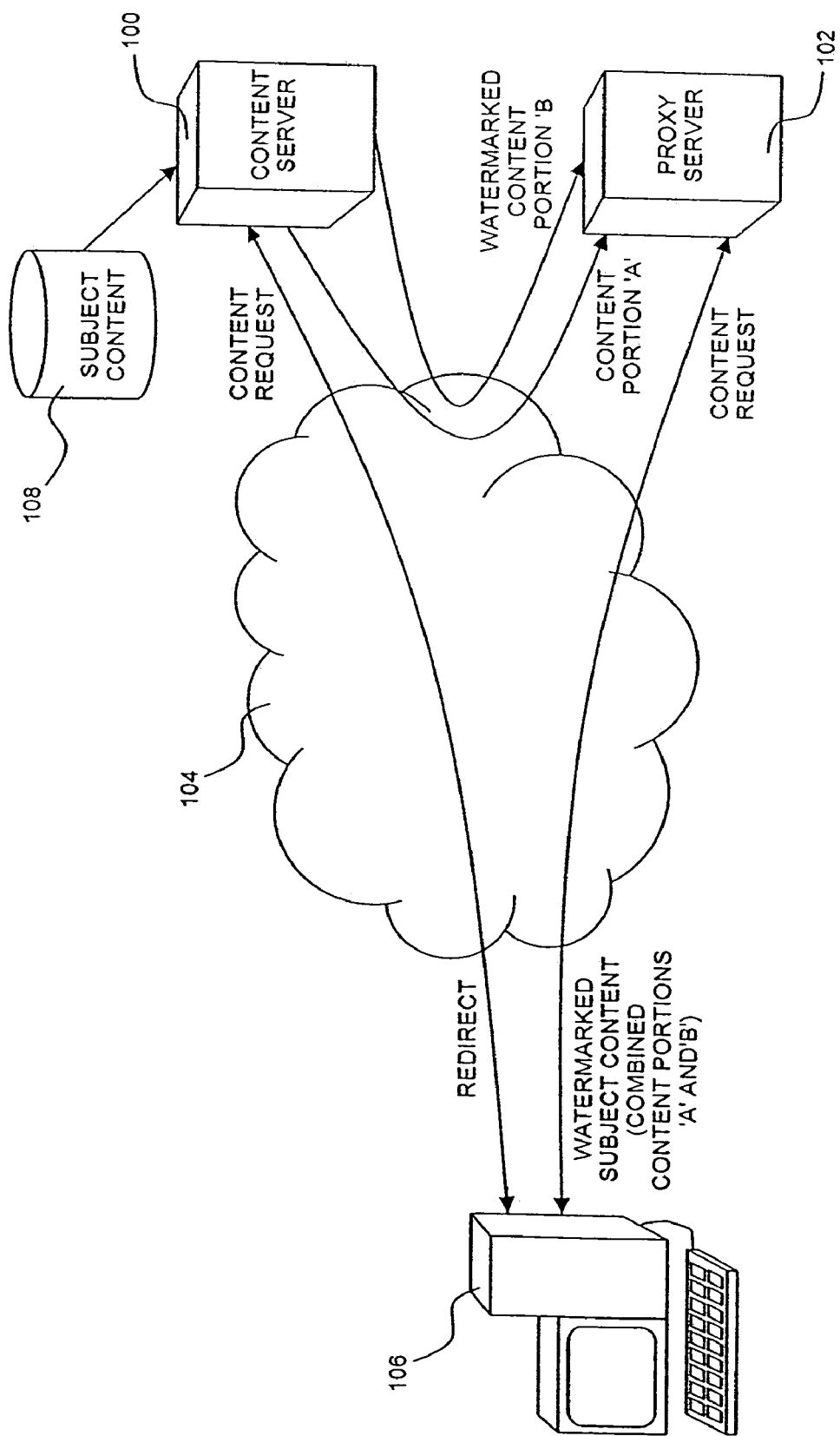
FIG. 1 is a simplified conceptual illustration of a system for secure distribution of digital content, constructed and operative in accordance with a preferred embodiment of the present invention.

Reference is now made to FIG. 1, which is a simplified conceptual flow illustration of a system for secure distribution of digital content, constructed and operative in accordance with a preferred embodiment of the present invention. In the system of FIG. 1 a first computerized apparatus, such as a content server 100, on which digital content is stored, divides a unit of digital content, hereinafter referred to as subject content 108, into at least two content portions 'A' and 'B' and sends content portion 'A' to one or more other computerized apparatus, such as proxy servers 102, typically via a network 104, such as the Internet, with content portion 'A' being stored on proxy server 102 for later distribution. An end-user at a receiving apparatus 106, such as any computerized apparatus such as a personal computer or a set-top box capable of connecting to network 104 for the purpose of data transmission, typically requests the subject content from content server 100, which then redirects receiving apparatus 106 to request the subject content from proxy server 102, with proxy server 102 typically being nearer to receiving apparatus 106 than is content server 100. Content server 100 then digitally watermarks content portion 'B' using any known digital watermarking technique, preferably uniquely watermarking content portion 'B' for exclusive association with the requesting end-user using identification information provided by the end-user. Content server 100 then sends the watermarked portion 'B' to proxy server 102. When receiving apparatus 106 requests the subject content from proxy server 102, proxy server 102 combines content portion 'A' with watermarked content portion 'B', resulting in a watermarked version of the original subject content which proxy server 102 then sends to receiving apparatus 106.

Figure 2:
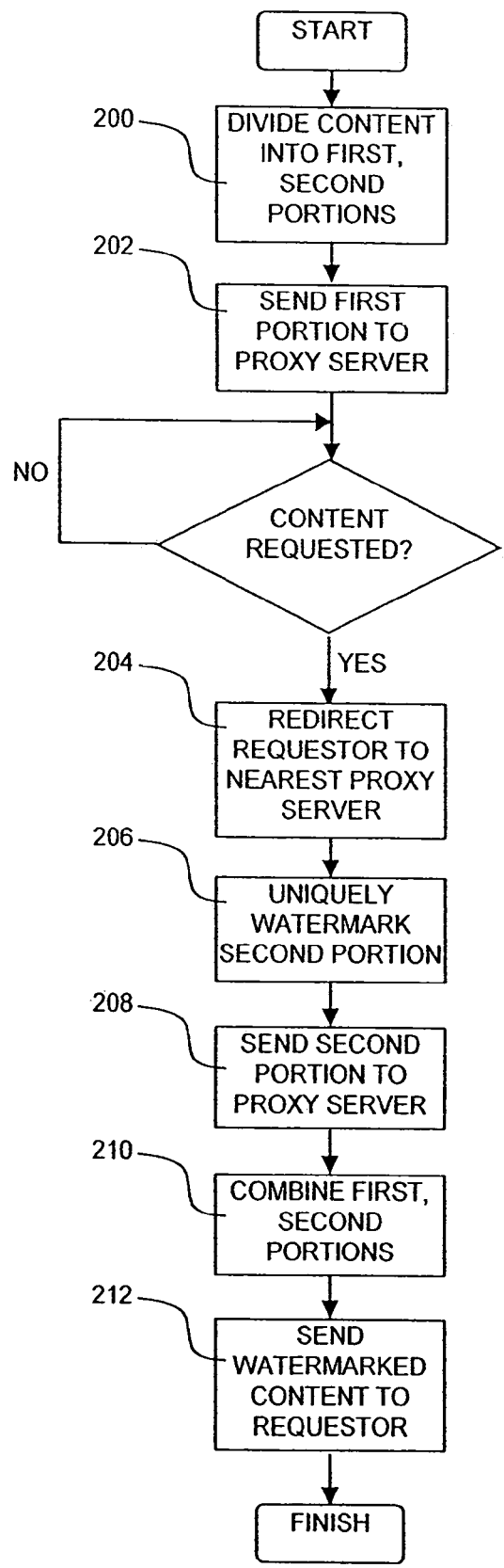
FIG. 2 is a simplified flowchart illustration of a method of operation of the system of FIG. 1, operative in accordance with a preferred embodiment of the present invention.
Figure 3:
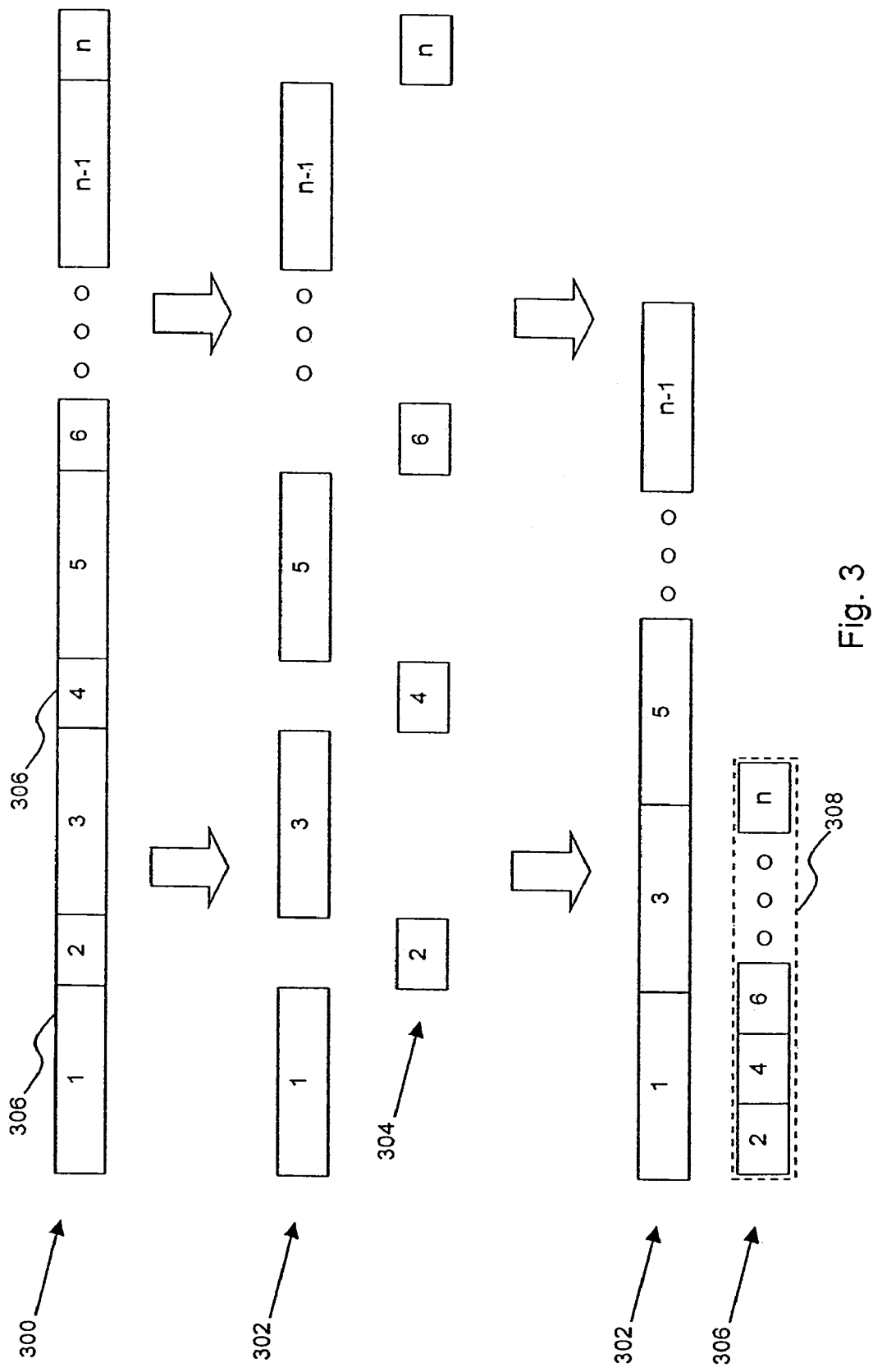
FIG. 3 is a simplified pictorial illustration of digital content in various states and stages in accordance with the application of the method of FIG. 2.

Reference is now made to FIG. 2, which is an simplified flowchart illustration of a method of operation of the system of FIG. 1, operative in accordance with a preferred embodiment of the present invention, and additionally to FIG. 3, which is a simplified pictorial illustration of digital content in various states and stages in accordance with the application of the method of FIG. 2. In the method of FIG. 2 a unit of digital content, generally designated 300, is divided into at least a first content portion, generally designated 302, and a second content portion, generally designated 304 (step 200). The division of content 300 may take place on a computer, such as content server 100 (FIG. 1), that is publicly accessible via a network, such as the Internet, or, preferably, on a computer to which access is limited to authorized users only and, most preferably, which is not accessible via network. Preferably, content portion 302 is significantly larger than content portion 304, and each portion is preferably constructed from non-contiguous segments 306 of content 300. Content portion 302 is then placed onto a network-connected computer, if it is not already on one, and is sent, preferably encrypted and/or digitally watermarked using conventional techniques, via network 104 to one or more proxy servers 102 for storage thereat (step 202).

Upon receiving a request for content 300, at content server 100 or at another request server assigned to handle content requests, the requestor is typically redirected to the nearest proxy server (step 204). Content portion 304 is then digitally watermarked using conventional techniques (step 206), preferably being uniquely watermarked for unique association with the requester, such as by incorporating an identification of the requestor into the watermark. Content portion 304, now watermarked and shown as watermarked content portion 306 with the watermark conceptually represented by dashed lines 308, is then placed onto a network-connected computer, if it is not already on one, such as content server 100, and is sent, preferably encrypted using conventional techniques, via network 104 to the proxy server 102 to which the requestor was redirected (step 208). Content portions 302 and 306 are then combined at proxy server 102 to form a watermarked version of the original subject content (step 210), which is then sent to the requester (step 212).

The division of content 300 may be carried out in any number of ways, but is preferably done such that each portion is, by itself, crippled or rendered inoperable. A portion is said to be crippled if a qualitative measure of the portion, using any conventional quality measurement technique, is degraded relative to a corresponding qualitative measure of the original subject content. For example, salient portions of the content, whose removal will greatly reduce the quality of the content, may be removed from the content to form the smaller content portion that is to be uniquely watermarked. Where the content includes both video and audio elements, the audio bitstream may be separated from the original content to form the smaller content portion. Where the content is compressed and encoded using standards such as MPEG-2 or MPEG-4, discrete elements of the encoded content, such as "I-frames," may be removed from the original content to form the smaller content portion, with one or more of the I-frames preferably bearing the unique watermark using conventional still image watermarking techniques. Global luminescence attributes or global motion vectors may be removed from video content to form the smaller content portion. Where the content has undergone coding such as Discrete Cosine Transform (DCT) coding, some or all of the DC coefficients and\or DCT coefficients of the frames vector may be removed to form the smaller content portion.

Figure 4:
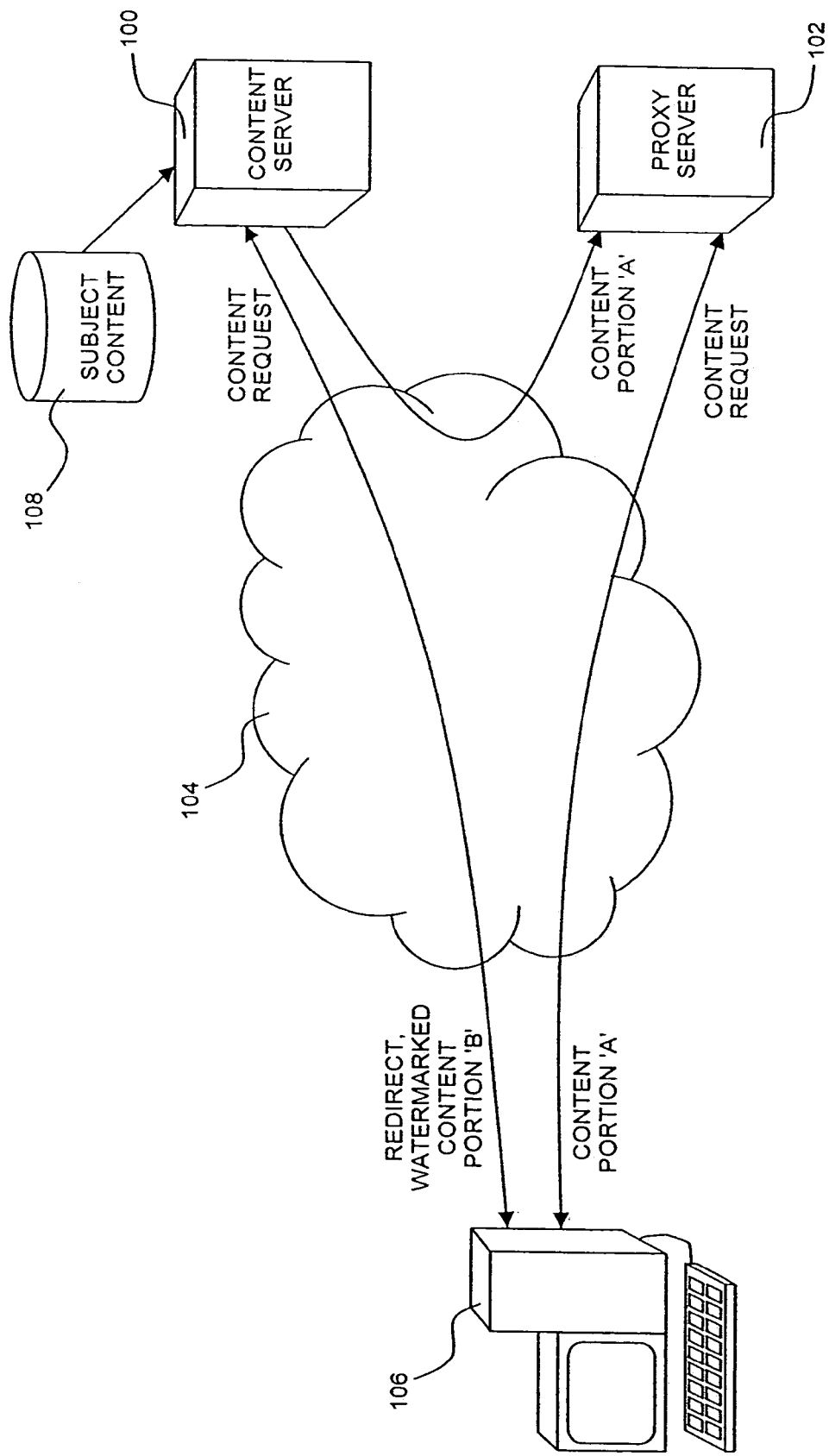
FIG. 4 is a simplified conceptual illustration of a system for secure distribution of digital content, constructed and operative in accordance with a preferred embodiment of the present invention.
Figure 5:
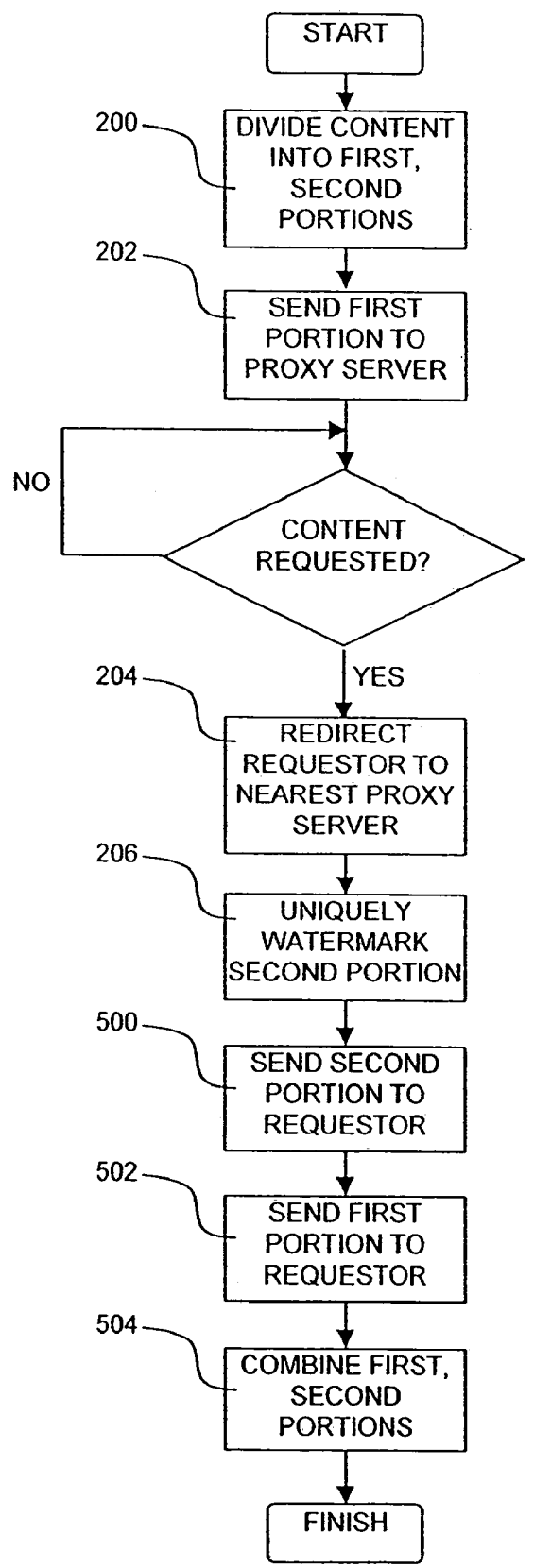
FIG. 5 is a simplified flowchart illustration of a method of operation of the system of FIG. 4, operative in accordance with a preferred embodiment of the present invention.

Reference is now made to FIG. 4, which is a simplified conceptual flow illustration of a system for secure distribution of digital content, constructed and operative in accordance with a preferred embodiment of the present invention, and additionally to FIG. 5, which is an simplified flowchart illustration of a method of operation of the system of FIG. 4, operative in accordance with a preferred embodiment of the present invention. The system of FIG. 4 and method of FIG. 5 are substantially similar to the system of FIG. 1 and method of FIG. 2 (including identical reference numerals for elements in common) with the notable exception that content server 100 digitally watermarks content portion 'B' and sends it directly to receiving apparatus 106 when the latter requests the subject content from content server 100, rather than sending watermarked content portion 'B' to proxy server 102 (step 500). Proxy server 102 separately sends content portion 'A' to receiving apparatus 106 (step 502), which then combines content portion 'A' with watermarked content portion 'B', resulting in a watermarked version of the original subject content (step 504).

Figure 6:
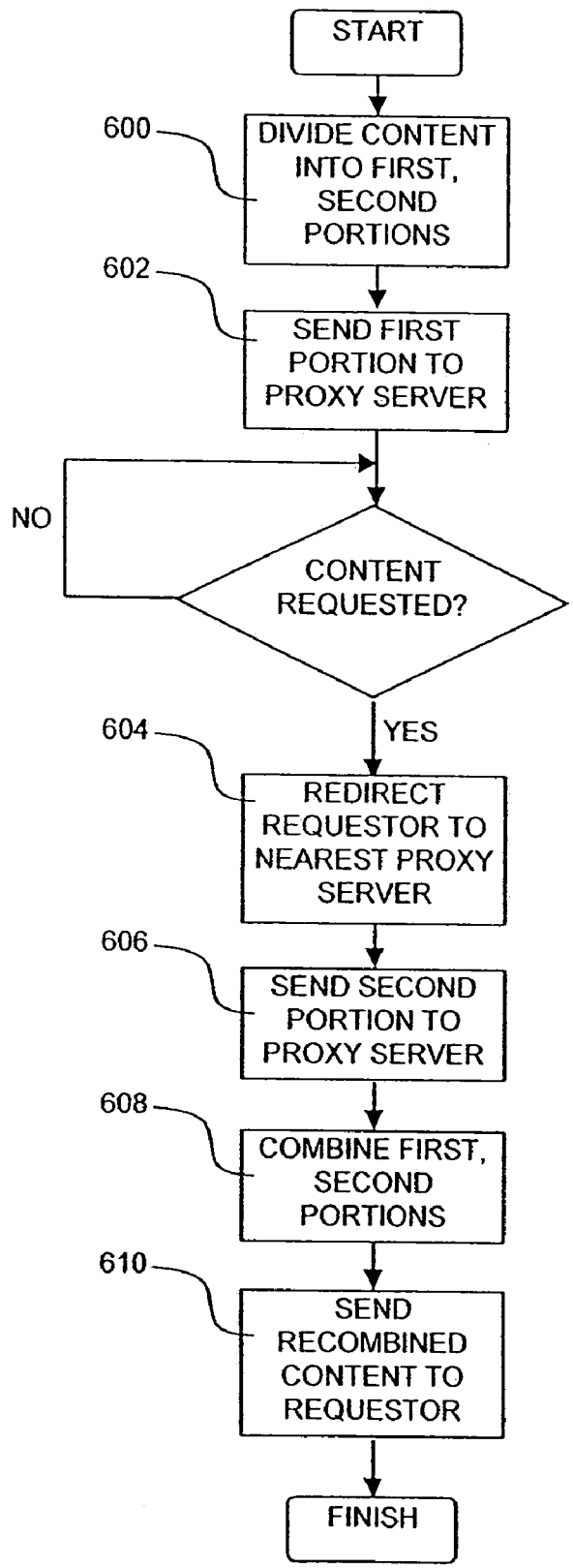
FIGS. 6 and 7, which are simplified flowchart illustrations of methods of operation of the systems of FIGS. 1 and 4 respectively, operative in accordance with a preferred embodiment of the present invention.
Figure 7:
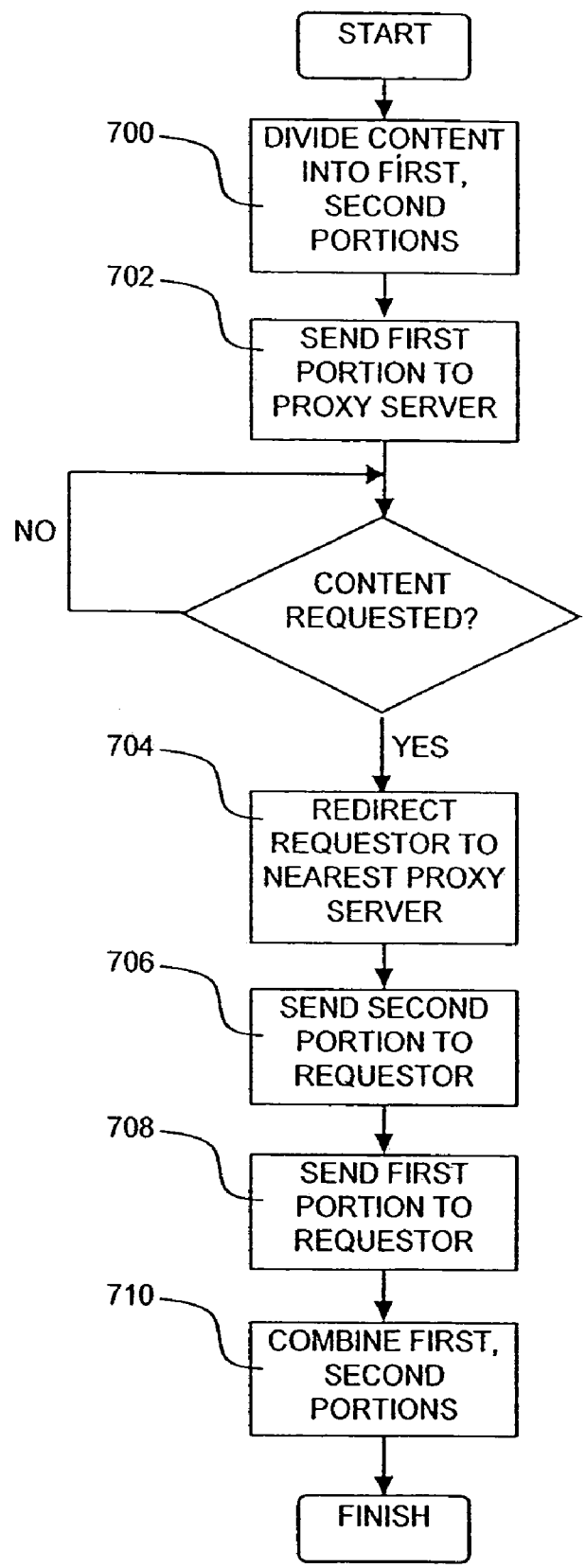

Reference is now made to FIGS. 6 and 7, which are simplified flowchart illustrations of methods of operation of the systems of FIGS. 1 and 4 respectively, operative in accordance with a preferred embodiment of the present invention. The methods of FIGS. 6 and 7 are substantially similar to the methods of FIGS. 2 and 5 respectively (including identical reference numerals for elements in common) with the notable exceptions that the original subject content is divided such that the second portion, and preferably both portions, are individually crippled or rendered inoperable, and neither portion is uniquely digitally watermarked. In both methods the second portion is substantially smaller than the first portion as well. In FIG. 6 the smaller content portion is combined with the larger content portion at the proxy server, and the combined content is sent to the requester. In FIG. 7 the smaller and larger portions are separately sent to the requestor and combined after receipt at the requestor.

It is appreciated that one or more steps of any of the methods described herein may be implemented in a different order than that shown while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for secure distribution of digital content, the method comprising the steps of: dividing a unit of digital content into at least first and second portions; storing said first portion on a first computerized apparatus; digitally watermarking said second portion; storing said digitally watermarked second portion on a second computerized apparatus; and combining said first portion and said digitally watermarked second portion: thereby forming a watermarked version of said digital content, wherein said dividing step comprises dividing said digital content into at least first and second portions, wherein each of said portions comprises non-contiguous segments of said digital content.

2. A method for secure distribution of digital content, the method comprising the steps of: dividing a unit of digital content into at least first and second portions; storing said first portion on a first computerized apparatus; digitally watermarking said second portion; storing said digitally watermarked second portion on a second computerized apparatus; and combining said first portion and said digitally watermarked second portion: thereby forming a watermarked version of said digital content, wherein said dividing step comprises dividing said digital content such that either of said first and second portions are individually inoperable.

3. A method for secure distribution of digital content, the method comprising the steps of: dividing a unit of digital content into at least first and second portions; storing said first portion on a first computerized apparatus; digitally watermarking said second portion; storing said digitally watermarked second portion on a second computerized apparatus; and combining said first portion and said digitally watermarked second portion: thereby forming a watermarked version of said digital content, wherein said storing said first portion step comprises storing on a proxy server.

4. A method for secure distribution of digital content, the method comprising the steps of: dividing a unit of digital content into at least first and second portions, wherein said first portion is larger than said second portion, and wherein said dividing step comprises either of: dividing said digital content such that a qualitative measure of either of said first and second portions is degraded relative to a corresponding qualitative measure of said digital content, and dividing said digital content such that either of said first and second portions are individually inoperable; storing said first portion on a first computerized apparatus; storing said second portion on a second computerized apparatus; and combining said first portion and said second portion, thereby recreating said digital content, wherein said dividing step comprises dividing said digital content into at least first and second portions, wherein each of said portions comprises non-contiguous segments of said digital content.

5. A method for secure distribution of digital content, the method comprising the steps of: dividing a unit of digital content into at least first and second portions wherein said first portion is larger than said second portion, and wherein said dividing step comprises either of: dividing said digital content such that a qualitative measure of either of said first and second portions is degraded relative to a corresponding qualitative measure of said digital content, and dividing said digital content such that either of said first and second portions are individually inoperable; storing said first portion on a first computerized apparatus; storing said second portion on a second computerized apparatus; and combining said first portion and said second portion, thereby recreating said digital content, wherein said storing said first portion step comprises storing on a proxy server.

6. A system for secure distribution of digital content, the system comprising: means for dividing a unit of digital content into at least first and second portions; means for storing said first portion on a first computerized apparatus; means for digitally watermarking said second portion; means for storing said digitally watermarked second portion on a second computerized apparatus; and means for combining said first portion and said digitally watermarked second portion, thereby forming a watermarked version of said digital content, wherein said means for dividing is operable to divide said digital content into at least first and second portions, wherein each of said portions comprises non-contiguous segments of said digital content.

7. A system for secure distribution of digital content, the system comprising: means for dividing a unit of digital content into at least first and second portions; means for storing said first portion on a first computerized apparatus; means for digitally watermarking said second portion; means for storing said digitally watermarked second portion on a second computerized apparatus; and means for combining said first portion and said digitally watermarked second portion, thereby forming a watermarked version of said digital content, wherein said means for dividing is operable to divide said digital content such that either of said first and second portions are individually inoperable.

8. A system for secure distribution of digital content, the system comprising: means for dividing a unit of digital content into at least first and second portions; means for storing said first portion on a first computerized apparatus; means for digitally watermarking said second portion; means for storing sad digitally watermarked second portion on a second computerized apparatus; and means for combining said first portion and said digitally watermarked second portion, thereby forming a watermarked version of said digital content, wherein said means for storing said first portion is operative to store on a proxy server.

9. A system for secure distribution of digital content, the system comprising: means for dividing a unit of digital content into at least first and second portions, wherein said first portion is larger than said second portions, said means for dividing being operative to either of: divide said digital content such that a qualitative measure of either of said first and second portions is degraded relative to a corresponding qualitative measure of said digital content, and divide said digital content such that either of said first and second portions are individually inoperable, means for storing said first portion on a first computerized apparatus; means for storing said second portion on a second computerized apparatus; and means for combining said first portion and said second portions thereby recreating said digital content, wherein said means for dividing is operative to divide said digital content into at least first and second portions and wherein each of said portions comprises non-contiguous segments of said digital content.

10. A system for secure distribution of digital content, the system comprising: means for dividing a unit of digital content into at least first and second portions, wherein said first portion is larger than said second portions, said means for dividing being operative to either of: divide said digital content such that a qualitative measure of either of said first and second portions is degraded relative to a corresponding qualitative measure of said digital content, and divide said digital content such that either of said first and second portions are individually inoperable, means for storing said first portion on a first computerized apparatus; means for storing said second portion on a second computerized apparatus; and means for combining said first portion and said second portions thereby recreating said digital content, wherein said means for storing said first portion is operative to store on a proxy server.

* * * * *